(12) United States Patent
Seiler et al.

(10) Patent No.: US 6,201,357 B1
(45) Date of Patent: Mar. 13, 2001

(54) OVERHEATING PROTECTION DEVICE FOR A CONTROL DEVICE IN GAS DISCHARGE LAMPS

(75) Inventors: Hartmut Seiler, Baden-Baden; Robert Kern, Bühlertal, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,129

(22) PCT Filed: Dec. 8, 1997

(86) PCT No.: PCT/DE97/02853

§ 371 Date: Oct. 13, 1999

§ 102(e) Date: Oct. 13, 1999

(87) PCT Pub. No.: WO98/33360

PCT Pub. Date: Jul. 30, 1998

(30) Foreign Application Priority Data

Jan. 25, 1997 (DE) .............................. 197 02 687

(51) Int. Cl.[7] .................................................. G05F 1/00
(52) U.S. Cl. .......................... 315/291; 315/307; 315/309; 315/297
(58) Field of Search ..................... 315/291, 297, 315/307, 309, 311, 112, 117, 76, 82, 224, 362

(56) References Cited

U.S. PATENT DOCUMENTS

| 4,355,344 | 10/1982 | Maurizio et al. ............... 361/103 |
|---|---|---|
| 5,635,799 | 6/1997 | Hesterman ...................... 315/127 |
| 5,680,015 | * 10/1997 | Bernitz et al. .................... 315/291 |
| 5,784,268 | * 7/1998 | Steffek et al. ...................... 363/55 |
| 5,925,990 | * 7/1999 | Crouse et al. ..................... 315/307 |
| 5,942,714 | * 8/1999 | Oberlin et al. ....................... 89/6.5 |
| 6,005,302 | * 12/1999 | Borho et al. ........................ 307/32 |
| 6,051,939 | * 4/2000 | Eckert ............................... 315/307 |

FOREIGN PATENT DOCUMENTS

| 44 06 533 | 12/1994 | (DE) . |
| 44 39 812 | 5/1996 | (DE) . |
| 96 22 007 | 7/1996 | (WO) . |

* cited by examiner

*Primary Examiner*—Don Wong
*Assistant Examiner*—Tuyet T. Vo
(74) *Attorney, Agent, or Firm*—Kenyon & Kenyon

(57) ABSTRACT

An arrangement for protecting a control device for gas discharge lamps from overtemperature contains a control device and a DC/DC converter. Regulation of the power conveyed to the gas discharge lamp is performed. The output value of the power controller (to be considered the manipulated variable) and the input value of the power controller (to be considered the setpoint) are ascertained by way of the control device. The ratio of these two values (manipulated variable to setpoint) is determined. The value determined for that ratio can be used to limit the output power of the control device. The control device may contains a microcontroller, and the controller is provided as a program in the microcontroller and is implemented as software in order to limit the output power of the control device.

6 Claims, 2 Drawing Sheets

OVERHEATING PROTECTION DEVICE FOR A CONTROL DEVICE IN GAS DISCHARGE LAMPS

FIELD OF THE INVENTION

The present invention relates to an arrangement for protecting a control device for gas discharge lamps from overtemperature.

BACKGROUND INFORMATION

In a conventional arrangement of this kind for adapting the power of a gas discharge lamp, as described in German Patent No. 44 39 812, a control device is provided for supplying power to the gas discharge lamp. The control device contains a DC/DC converter that converts a DC voltage into another DC voltage, as well as a bridge circuit, in particular an H bridge, in whose diagonal branch the gas discharge lamp is located. The gas discharge lamp is supplied with AC voltage or alternating current by way of the bridge circuit. Regulation of the power conveyed to the gas discharge lamp is performed. In the event of a reduction in the mean lamp power as compared to rated operation, provision is made for a lengthening of the period of the lamp AC voltage or the lamp alternating current. As a result, the low frequency at which the lamp is operated is decreased even further. This power decrease also serves, if applicable, to protect the control device from overtemperature in order to prevent it from being damaged.

In addition to this conventional lengthening of the period in order to improve the polarity reversal operation at reduced power, and to prevent damaging overtemperatures in the control device, it is also known to ascertain the temperature of a control device using a sensor, and then to limit the maximum output power.

SUMMARY

The arrangement according to the present invention has the advantage that without using a temperature sensor, damage to the control device due to overtemperature and/or excessive load can be easily and economically prevented.

According to the present invention, in an arrangement for protecting a the output value of the power controller (i.e. the control voltage of the DC/DC converter, to be considered the manipulated variable) and the input value of the power controller (to be considered the setpoint) are ascertained; the ratio of these two values (manipulated variable to setpoint) are determined; and the value determined for the above ratio to limit the output power of the control device is used.

According to an example embodiment of the arrangement according to the present invention, the DC/DC converter contains MOSFET transistors as the switching transistors.

In accordance with a an example embodiment of the present invention, the control device contains a microcontroller, and the power controller is provided as a program in the microcontroller and is implemented as software in order to limit the output power of the control device.

In an additional example embodiment of the arrangement according to the present invention, the power controller is used to reduce the power dissipation of the control device when the gas discharge lamp is in operation, in particular during steady operation at normal power, to prevent overtemperature at the control device.

According to an example application of the arrangement according to the present invention, the arrangement is used in motor vehicles for the operation of gas discharge lamps, in particular high-pressure gas discharge lamps, in headlights.

DETAILED DESCRIPTION

Figure 1:
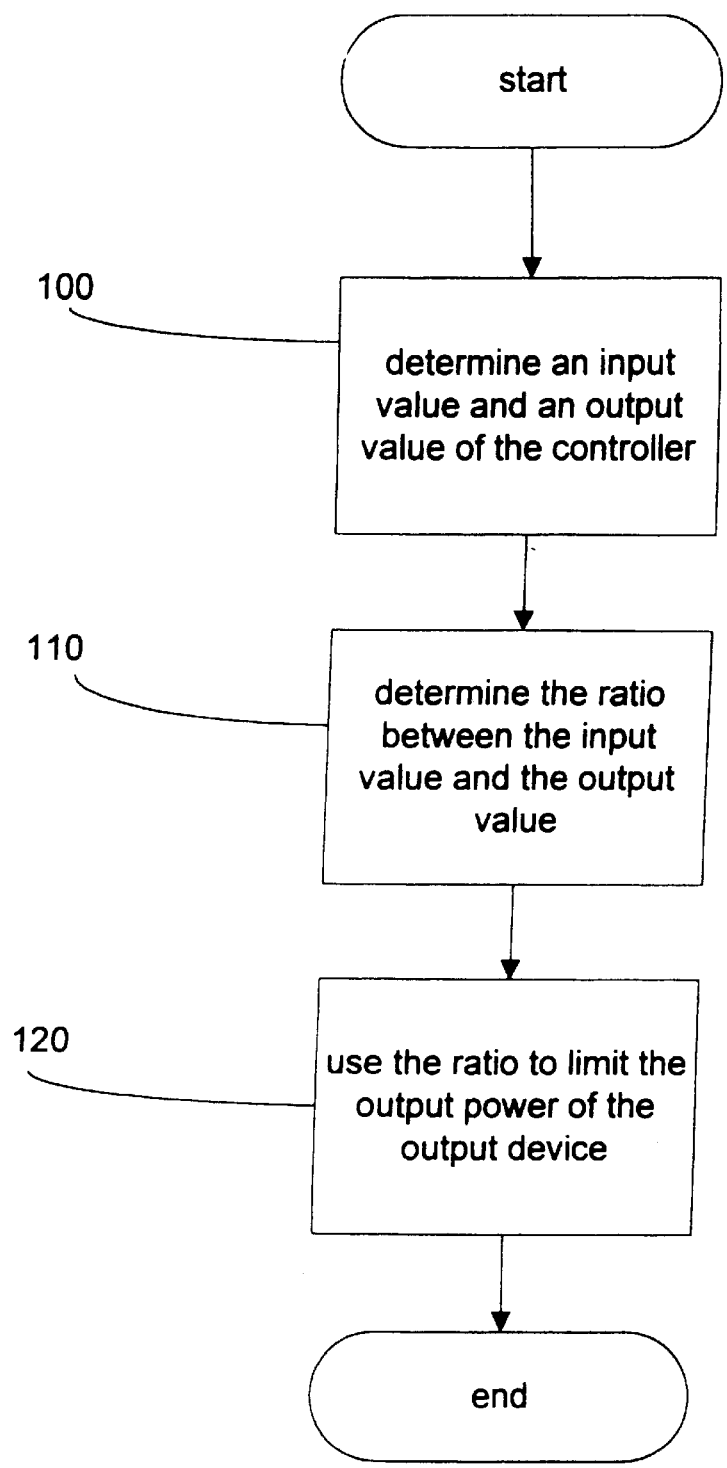
FIG. 1 is a flow chart according to an example embodiment of the present invention.

The present invention is based on the recognition that at higher temperature, the ratio of the output value of the power controller (i.e. in particular the control voltage of the DC/DC converter), which is to be considered the manipulated variable, to the input value at the power controller, to be considered the setpoint, becomes greater. According to the present invention as shown in FIG. 1, these two variables are ascertained using the control device (100), and the ratio of these two values (i.e. manipulated variable to setpoint) is then determined therefrom (110). This ratio represents a value for the efficiency and thus the temperature of the control device. Once ascertained, this ratio can be used to limit the output power of the control device.

Figure 2:
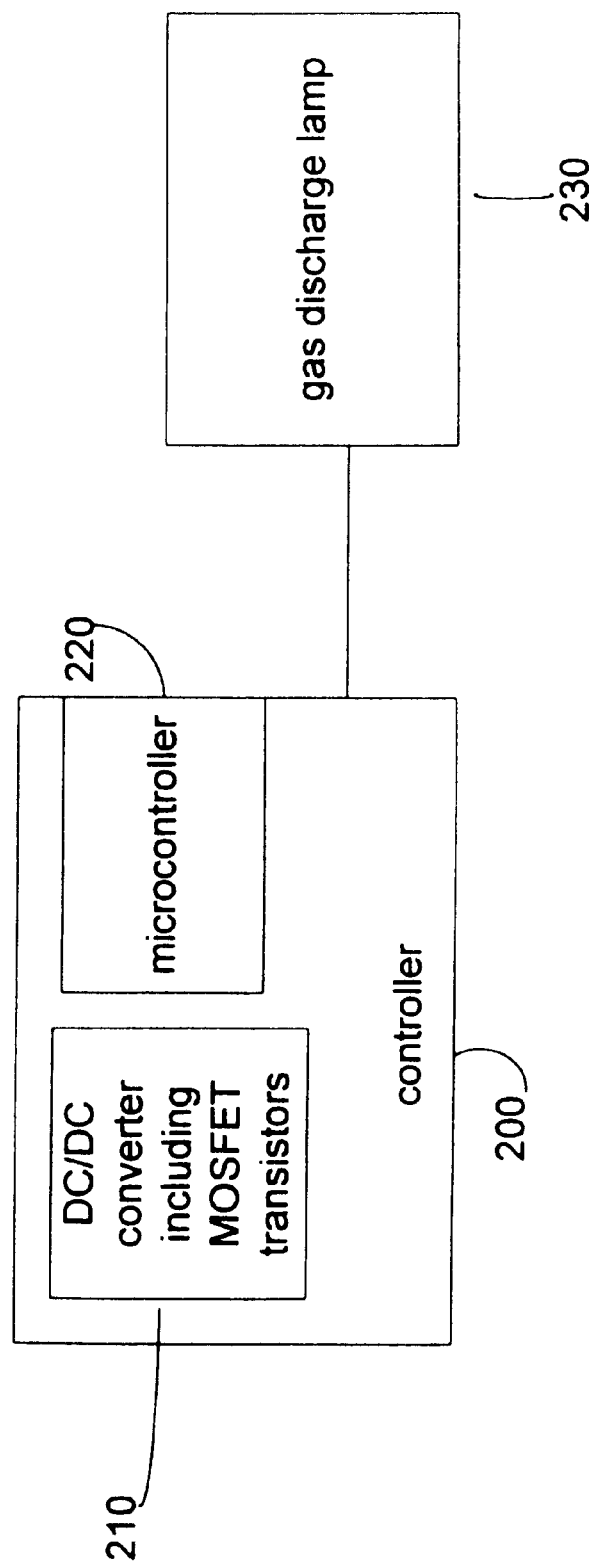
FIG. 2 shows a control device and a gas discharge lamp.

According to one exemplary embodiment of the arrangement according to the present invention shown in, for example, FIG. 2, the DC/DC converter contains MOSFET transistors as switching transistors 210. It is the case in general with such voltage converters that the drain-source resistance of a switching transistor in the "on" state ($R_{DSon}$) becomes higher with higher temperature, and the efficiency thus deteriorates. The copper resistance of the converter inductance also rises, and the switching losses of the converter diode become greater. The only variable that yields lower losses with rising temperature is the diode flux voltage. This reducing influence compensates very little, however, for the deterioration in efficiency.

The output power of the control device in accordance with the present invention is regulated to a specific value that is as constant as possible. As a result, the deterioration in efficiency is stabilized by using integral component of the controller. Because of this the ratio of the controller output (considered as the manipulated variable) to the controller input (considered as the setpoint) is ascertained, and then analyzed as a value for the efficiency and thus also for the temperature of the control device. This ratio value is used to control and limit the output power of the control device, thereby ensuring that the temperature of the control device does not rise above permissible values.

According to an embodiment of an arrangement according to the present invention, the change in the ratio value (manipulated variable to setpoint), ascertained by the power controller, is more pronounced if the current mode method is used in the DC/DC converter, with the current sensed by way of the voltage drop through the drain-source resistance section of the switching transistor.

According to the control device contains a microcontroller 220, and the power controller is provided as a program in the microcontroller and is implemented as software in order to limit the output power of the control device. This embodiment contains a flexible configuration for the control device, and does not require special components.

The present invention is preferably used to reduce the power dissipation of the control device when the gas discharge lamp 230 is in operation, in particular during steady operation at normal power, to prevent overtemperature at the control device. A use of this kind in motor vehicles for the operation of gas discharge lamps, in particular high-pressure gas discharge lamps, is of particular significance for the safety and reliability of the control devices increasingly being used therein.

The present invention allows the output power of the control device to be limited for protection against overtemperature with no need to use special temperature sensors or other special components.

What is claimed is:

1. An arrangement for protecting a control device for a gas discharge lamp from overtemperature, the control device including a DC/DC converter and regulating power conveyed to the gas discharge lamp, comprising:

a first arrangement for determining an output value of the DC/DC converter and an input value of the DC/DC converter, the output value being a manipulated variable and the input value being a setpoint;

a second arrangement for determining a ratio of the output value and the input value, an output power of the control device being limited as a function of the determined ratio.

2. The arrangement according to claim 1, wherein the DC/DC converter includes MOSFET transistors used as switching transistors.

3. The arrangement according to claim 1, wherein the control device includes a microcontroller, and first arrangement and the second arrangement are implemented in a program executed by the microcontroller.

4. The arrangement according to claim 1, wherein the arranged is used to reduce power dissipation of the control device when the gas discharge lamp is in steady state operation at normal power to prevent overtemperature at the control device.

5. The arrangement according to claim 1, wherein the gas discharge lamp includes a high-pressure gas discharge lamp in a headlight.

6. A method for protecting a control device for a gas discharge lamp from overtemperature, the control device including a DC/DC converter and regulating power conveyed to the gas discharge lamp, comprising:

determining an output value of the DC/DC converter and an input value of the DC/DC converter, the output value being a manipulated variable and the input value being a setpoint;

determining a ratio of the output value and the input value; and limiting an output power of the control device as a function of the determined ratio.

* * * * *

UNITED STATES PATENT AND TRADEMARK OFFICE
CERTIFICATE OF CORRECTION

PATENT NO.     : 6,201,357 B1
DATED          : March 13, 2001
INVENTOR(S)    : Seiler et al.

It is certified that error appears in the above-identified patent and that said Letters Patent is hereby corrected as shown below:

<u>Title page,</u>
Item [54], change the title to read -- ARRANGEMENT FOR PROTECTING A CONTROL DEVICE FOR GAS DISCHARGE LAMPS FROM OVERTEMPERTURE --;

<u>Column 2,</u>
Line 19, change "device" to -- device (120). --;
Line 34, change "device" to -- device --;
Line 35, change "invention" to -- invention, --;
Line 53, change "to the ..." to -- to an example embodiment of an arrangement according to the present invention, the ... --;

<u>Column 4,</u>
Line 2, change "arranged" to -- arrangement --.

Signed and Sealed this

Eighteenth Day of March, 2003

JAMES E. ROGAN
*Director of the United States Patent and Trademark Office*